Figure 1:
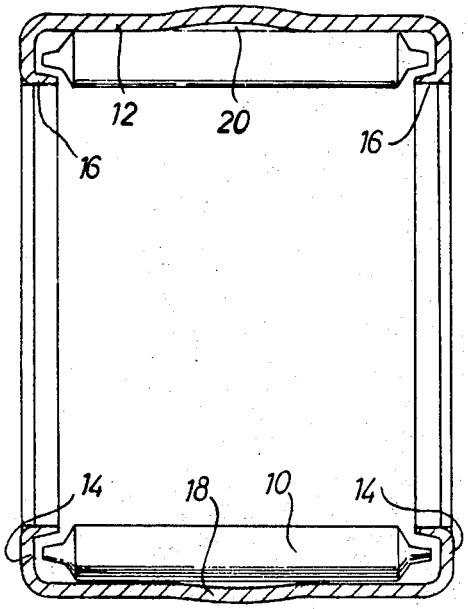

United States Patent

[11] 3,539,232

| [72] | Inventor | Robert S. Batt<br>Barby, near Rugby, England |
|---|---|---|
| [21] | Appl. No. | 701,923 |
| [22] | Filed | Jan. 31, 1968 |
| [45] | Patented | Nov. 10, 1970 |
| [73] | Assignee | The Torrington Company Limited<br>Coventry, Warwickshire, England |
| [32] | Priority | Jan. 31, 1967 |
| [33] | | Great Britain |
| [31] | | 4,615/67 |

[54] ROLLER BEARINGS
12 Claims, 8 Drawing Figs.

[52] U.S. Cl.................................................. 308/212
[51] Int. Cl................................................... F16c 13/00
[50] Field of Search...................................... 308/212,
216, 187.1, 187.2, 213

[56] References Cited
UNITED STATES PATENTS

| 1,545,833 | 7/1925 | Howe | 308/184(A)UX |
| 2,928,702 | 3/1960 | Pitner | 308/216X |
| 3,284,145 | 11/1966 | Bixby | 308/187.2 |
| 3,306,682 | 2/1967 | Cowles | 308/187.2 |
| 1,358,444 | 11/1920 | Helmstaedter | 308/30X |
| 1,722,488 | 7/1929 | Bott | 308/187.2 |
| 1,985,693 | 12/1934 | Robinson | 308/187.2 |
| 2,819,932 | 1/1953 | Walker | 308/29 |
| 3,348,889 | 10/1967 | Schaeffler | 308/187.2 |
| 3,423,140 | 1/1969 | Cowles | 308/187.2 |

FOREIGN PATENTS

| 1,357,455 | 12/1964 | France | 308/187.1 |
| 458,243 | 12/1936 | Great Britain | 308/216 |
| 878,279 | 9/1961 | Great Britain | 308/87.2 |
| 924,605 | 4/1963 | Great Britain | 308/187.2 |
| 878,329 | 9/1961 | Great Britain | 308/213 |

OTHER REFERENCES 1,162,646 2/64 German Printed Application (Schaeffler) 308/187.2 1/2

1,195,098 6/65 German Printed Application (Schaeffler) 308/213 1/2

Primary Examiner—Fred C. Mattern, Jr.
Assistant Examiner—Frank Susko
Attorney—Diller, Brown, Ramik and Holt ABSTRACT: The invention relates to needle roller bearings of the type wherein a plurality of needle rollers are circularly distributed around the interior of a drawn sheet metal outer bearing race. In a bearing of this type, the invention is especially concerned with enabling the bearing to be self-aligning and achieves this by outwardly bulging a selected region of the outer race to provide a circumferential region of part-spherical configuration externally of the race, at the same time providing a substantial lubricant reservoir beneath the bulge. In another feature, the invention provides a so-called drawn cup bearing with annular end seals cooperating with radially inwardly directed end lips of the outer race to seal the bearing relative to a shaft intended to pass through it. The end seals may be carried by the race end lips or they may themselves have radially directed sealing lips fitting closely around the race lips to define labyrinth seals at the bearing ends.

INVENTOR:
ROBERT S. BATT

Patented Nov. 10, 1970

3,539,232

INVENTOR:
ROBERT S. BATT
BY
Mason, Porter, Diller & Brown
ATTORNEYS

INVENTOR:
ROBERT S. BATT
BY
Mason, Porter, Diller & Brown
ATTORNEYS

ROLLER BEARINGS

This invention concerns rolling bearings.

One widely used construction of rolling bearings comprises an outer race drawn from sheet metal and containing a plurality of rollers or so-called needles distributed around its inner circumference, the rollers or needles sometimes being retained and guided in a cage. Although such bearings have a satisfactory bearing capacity for their size and display a number of other advantages both in manufacture and in use, they are capable of accommodating only limited deflection or misalignment of a shaft on which they are normally mounted. In cases of deflection or misalignment, therefore, it is usual to provide a bearing with some form of self-aligning feature, for example, by mounting it in a specially shaped bearing housing or by providing it with a specially shaped, solid machined outer race. Both these conventional solutions of the problems of shaft deflection or misalignment, however, are expensive and demanding in terms of space requirements.

Another problem in rolling bearings which are required to work in atmospheres contaminated by particulate foreign matter is to prevent such foreign matter from penetrating into the bearing interior.

One feature of the present invention accordingly provides a rolling bearing having a drawn outer race or cup and in which said cup has a radially outwardly displaced and part-spherical circumferential region.

By reason of the part-spherical circumferential region, therefore, the invention enables the bearing to be self-aligning in situations where deflection or misalignment occurs of the shaft on which the bearing is mounted in use, and at the same time, the incorporation of the self-aligning feature in the outer race itself both saves space and avoids additional expense in the otherwise necessary provision of a special housing or specially shaped solid machined outer race. In addition, the space created by the radially displaced part of the cup serves as a valuable lubricant reservoir which provides the bearing with a longer than normal prepacked lubricant life.

According to another feature of the invention, a drawn cup rolling bearing having a radial lip or flange at least at one end of the bearing is arranged with said flange carrying or cooperating with a dirt-excluding seal, preferably a labyrinth seal.

The drawn cup may be formed in known manner at one or both ends with a radially inwardly directed flange to retain a cage for guiding the rolling elements and these flanges may conveniently cooperate with annular seals intended to exclude foreign matter from entering the bearing by way of the space between the outer race and the shaft or, if an inner race is provided, between the inner and outer races. Such annular seals may, for example, be secured to the radial flanges as by moulding and make resiliently yielding engagement with the shaft or with the inner race, or alternatively they may be a light interference fit on the shaft or on the inner race and have labyrinth elements cooperating with the radial flanges to complete the sealing effect.

The radially displaced circumferential region of the drawn cup may be formed by rolling and may either be situated centrally of or towards one end of the drawn cup.

Figure 2:
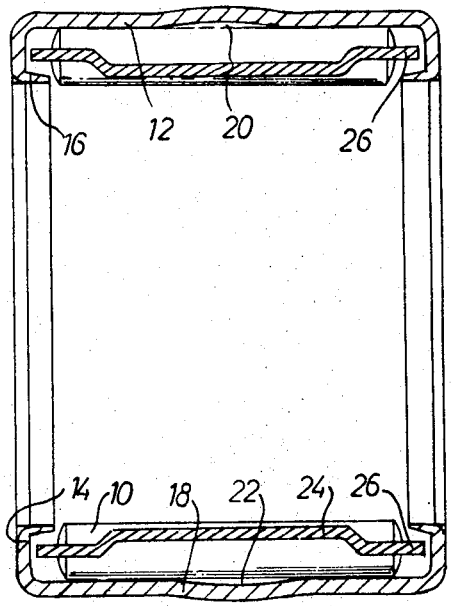
Figure 3:
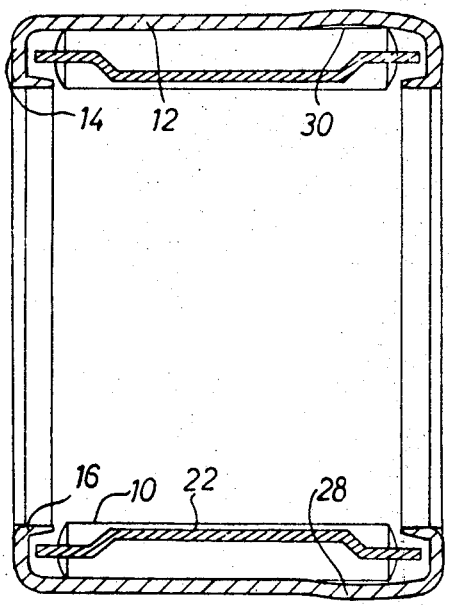
Figure 4:
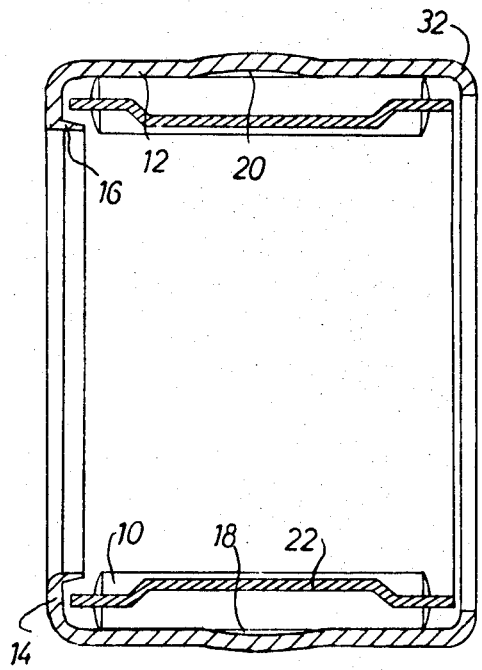
Figure 5:
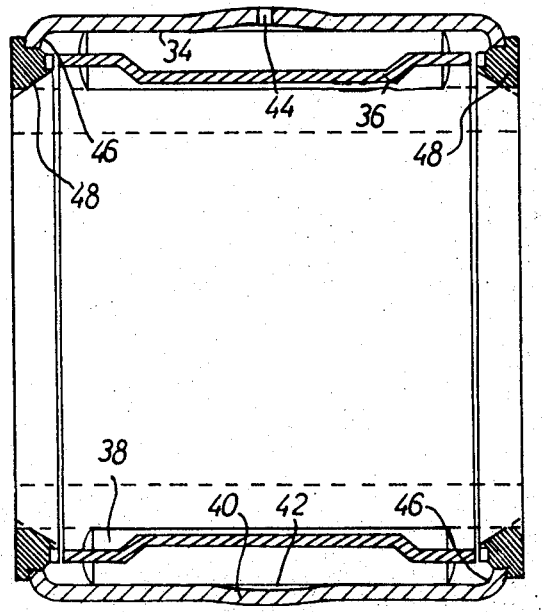
Figure 6:
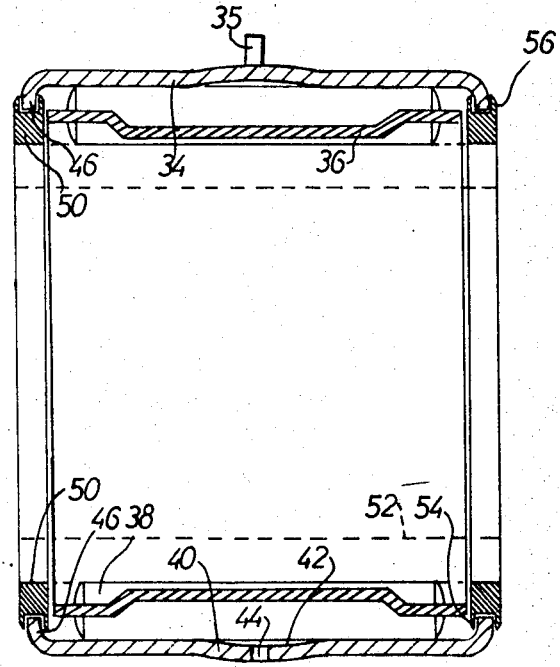
Figure 7:
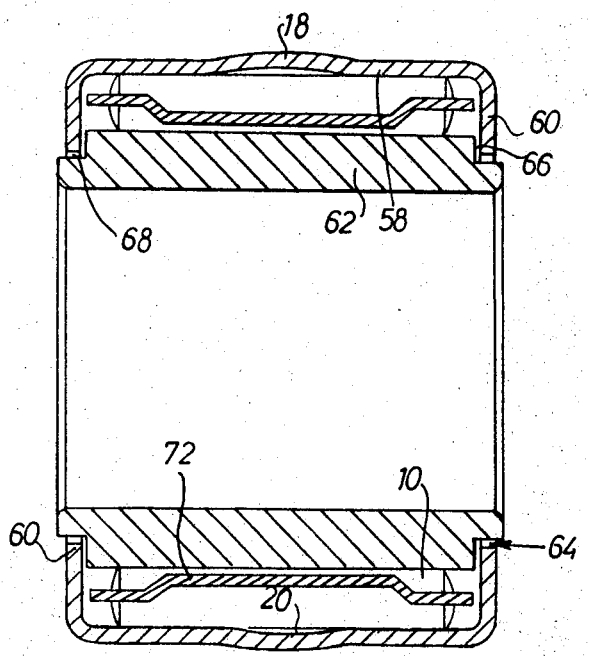
Figure 8:
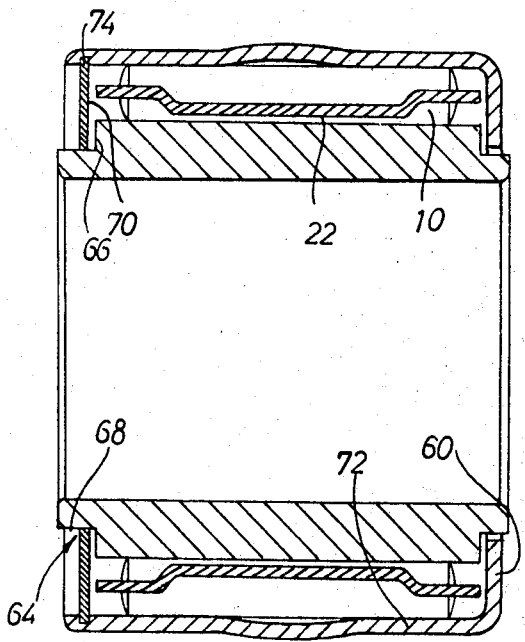

The invention will be described further, by way of example, with reference to the accompanying drawings, in which:

FIG. 1 is an axial section through one embodiment of rolling bearing in accordance with the invention, FIG. 2 is a similar section through another embodiment of bearing employing a cage or retainer for the rolling elements, FIG. 3 is a similar section illustrating the provision of a radially displaced circumferential region towards one end of an outer race of the bearing, FIG. 4 is an axial section of a bearing having an outer race with a modified form of end lip or flange, FIG. 5 is a similar section through a bearing employing annular end seals, FIG. 6 is a similar section through a bearing provided with modified end seals, FIG. 7 is a similar section illustrating a bearing having radially inner and outer races cooperating to constitute annular labyrinth end seals, and FIG. 8 is a section showing a modification of the bearing of FIG. 7.

In the bearing illustrated in FIG. 1, rollers or needles 10 are circularly distributed in adjoining and axially parallel relation around the internal cylindrical surface of a drawn sheet metal outer bearing race 12. The race 12 is formed with radially inwardly directed, annular end lips or flanges 14, each of which terminates in a radially innermost, axially directed portion 16, the opposed terminal portions 16 serving to retain the rollers in the race 12 to enable the resulting bearing to be handled as a self-contained unit.

As proposed by the invention, the bearing race 12 is formed with a central, radially outwardly displaced circumferential region 18 of part-spherical configuration. The radially displaced, circumferential region 18 is conveniently formed by a rolling operation carried out at a suitable stage in the manufacture of the race and renders the bearing of a self-aligning character. For example, a bearing as illustrated in FIG. 1 is particularly suited for use in an electrically driven power tool such as an electric drill, which usually includes a split housing enclosing an electric driving motor for the tool. Due to the split nature of this housing, misalignment of the motor driving shaft may occur during assembly or in use of the power tool when the two housing parts are fitted together. By supporting the motor shaft in a bearing formed with the self-aligning part-spherical region 18 shown in FIG. 1, the invention enables motor shaft deflections to be accommodated while preserving proper operation of the motor and its shaft. At the same time, the annular space 20 defined between the ring of rollers 10 and the internal concavity of the part-spherical region 18 constitutes a lubricant reservoir allowing the bearing to be prepacked with a substantial supply of lubricant.

The bearing illustrated in FIG. 2 differs from that of FIG. 1 principally by the provision of a cage or retainer 22 which is formed in conventional manner with roller retaining pockets (not shown) defined between circumferentially adjacent cage bars 24 extending axially between annular end rings 26. Each roller 10 is seated in a pocket of the retainer and the cage bars 24 are so shaped as to guide the rollers in their pockets and to retain them therein, at least in a radially inward direction. The cage 22 itself is retained in the race 12 by the terminal portions 16 of the end lips 14.

A bearing similar to that of FIG. 2 is shown in FIG. 3, but differs in that a radially outwardly displaced, part-spherical circumferential region 28 is formed towards one end of the race 12 instead of centrally thereof. The part-spherical region 28 internally defines a lubricant reservoir 30.

FIG. 4 shows a bearing again similar to that of FIG. 2 but wherein one of the end lips, designated 32, is given an internal diameter somewhat greater than the outside diameter of the cage 22. In this way, the bearing race may be manufactured with both end lips 14 and 32 curled in the initial stages of manufacture and no final lip curling operation is then required.

Since the practice hitherto in power tools of the type mentioned above has been to arrange a plain cylindrical rolling bearing in a separate bronze sleeve having a machine part-spherical external surface, the invention, as illustrated by way of example in FIGS. 1 to 4, eliminates the expense of such a sleeve, saves space in the tool housing for the same reason or enables a larger size of bearing to be used in the same housing space as previously. Additionally, the lubricant reservoir 20 or 30 defined within the interior of the part-spherical, displaced region of the bearing race makes it possible to prepack within the bearing, a far greater supply of grease or the like than a plain bearing is capable of accepting.

FIGS. 5 to 8 of the drawings, illustrate bearings which, in addition to incorporating the self-aligning feature already described, include annular end sealing means for preventing damaging foreign matter from entering the bearing. A typical environmental use for such a bearing is in a textile bottom drafting roll assembly. As will be appreciated, textile drafting machines are of considerable length and this length, together with uneven floor surfaces and tolerances over the length of a machine can produce significant misalignment of the shafts in a machine. Conventional bearings used for such shafts normally require a number of expensive and bulky machined parts which must cater for the inclusion in the bearing of seals, built-in locating pegs and built-in grease nipples for frequent relubrication of the bearing.

As shown in FIG. 5, for example, the invention avoids the majority of these disadvantages by providing a bearing having a drawn sheet metal outer race 34 within which is retained a cage 36 in turn retaining a plurality of circularly distributed rollers or needles 38. The race 34 is formed with a centrally situated, radially outwardly displaced circumferential region 40 of part-spherical shape defining an internal lubricant reservoir 42 and provided with a lubricant aperture 44. At each axial end, the race 34 is provided with a radially inwardly directed end lip 46 having an internal diameter which is greater than the outside diameter of the cage 36, and to each end lip 46 there is secured an annular seal 48 which may be of a plastics material such as neoprene or of a natural or synthetic rubber compound. The seal 48 may be a resilient press fit on the end lip 46 or it may be positively secured to the lip by adhesive or by moulding. It will be noted that the seal shown in FIG. 5 is of the lip rubbing type, having its internal circumference adapted to ride on a shaft supported by the bearing.

As an alternative to this construction, FIG. 6 illustrates a bearing employing annular end seals 50 of a material similar to that of the seals 48 but dimensioned to be a press fit on a shaft diagrammatically indicated at 52 and with which the bearing is intended to cooperate. The seals 50 are each formed with radially outwardly directed, spaced axially inner and outer sealing lips 54 and 56 respectively which closely enclose the race end lips 46 to provide a labyrinth seal between the bearing interior and its surrounding environment.

Instead of using separate seals 48 or 50, FIG. 7 shows a bearing construction in which the outer race cooperates with an inner race to define a labyrinth seal between them at each axial end of the bearing. The outer race 58 is provided with axial end lips 60 having a bore of which the diameter is substantially less than the inside diameter of the cage 22. The rollers 10 run on a radially inner, cylindrical race 62 which at each end is formed with an annular rebate 64 in its external peripheral surface, the rebate 64 having a radial end wall 66 and an axially directed cylindrical surface 68. The race end lips 60 thus fit into the rebates 64 to cooperate with the end walls 66 and cylindrical surfaces 68 thereof to define a labyrinth seal at each end of the bearing.

A modification of the seal described immediately above is illustrated in FIG. 8 which differs primarily in the provision of a separate annular end flange 70 secured to the outer race 72 at one end thereof, in place of one of the end lips 60. As evident from FIG. 8, one method of fitting the separate flange 70 is by snap fitting it into an internal annular groove 74 formed in the outer race and subsequently subjecting the latter to a rolling or pressing operation, if required to close the groove on to the flange.

It will be appreciated that any of the bearings described herein may be provided, if required, with a locating peg welded on to the drawn outer race or with any other suitable radial protrusion such as an eyelet pressing capable of locating the bearing in a desired position. Similarly, any of the described bearings may have a grease nipple secured as by welding to the outer race. Instead of welding a locating peg and/or a grease nipple to the outer race, however, they may be located in an eyelet pressing secured in the race or they may be located on the race by means of an eyelet pressing. A typical mounting position for a grease nipple or for a locating peg is diagrammatically indicated at 35 in FIG. 6.

I claim:
1. In a rolling bearing comprising a drawn metal outer race and a plurality of rolling elements arranged in circularly distributed relation in said race in rolling contact with said race, each rolling element having a major portion of the effective length thereof engaging said race, the improvement comprising a radially outwardly displaced and part-spherical in axial section region on said race extending entirely circumferentially thereabout to render said bearing self-aligning.

2. A bearing as set forth in claim 1, wherein said part-spherical circumferential region is situated centrally of said race.

3. A bearing as set forth in claim 1, wherein said part-spherical circumferential region is situated towards one axial end of said race.

4. A bearing as set forth in claim 1, wherein said part-spherical region internally defines a concavity constituting a lubricant reservoir.

5. A bearing as set forth in claim 4, wherein said part-spherical region is formed with an aperture communicating with said reservoir.

6. A bearing as set forth in claim 4, further comprising a grease nipple mounted externally on said part-spherical region to communicate with said reservoir.

7. A bearing as set forth in claim 4, further comprising a radially directed race-locating peg mounted externally on said part-spherical region.

8. A bearing as set forth in claim 1, further comprising radially inwardly directed end lips on the outer bearing race and annular sealing means cooperating with each end lip to seal the bearing relative to a shaft intended to pass through it.

9. A bearing as set forth in claim 8, wherein said sealing means is an annular seal carried by each of said end lips.

10. A bearing as set forth in claim 8, wherein said sealing means includes at each end of the bearing, an annular seal adapted to make a light interference fit with said shaft and a pair of axially spaced, radially outwardly directed sealing lips on said annular seal, the end lip at said end of said bearing fitting closely between said sealing lips to cooperate therewith in establishing a labyrinth seal at said bearing end.

11. A bearing as set forth in claim 8, further comprising a radially inner bearing race formed at each of its axial ends with a circumferential rebate in its external periphery, said rebate having an axially inner and radially directed wall and an adjoining cylindrical wall, and in which each axial end lip of the outer bearing race fits closely within one of said rebates to cooperate with the radial and cylindrical walls thereof in defining a labyrinth seal at the respective end of the bearing.

12. A bearing as set forth in claim 11, wherein one of the end lips of the outer bearing race is a separate annular flange secured to said race.